United States Patent
Bryskin

(10) Patent No.: US 8,761,045 B2
(45) Date of Patent: Jun. 24, 2014

(54) METHOD FOR PROVIDING NETWORK FAILURE INDEPENDENT LINKS IN A MULTILAYER NETWORK

(75) Inventor: Igor Bryskin, Great Falls, VA (US)

(73) Assignee: ADVA Optical Networking SE, Meiningen OT Dreissigacker (DE)

( * ) Notice: Subject to any disclaimer, the term of this patent is extended or adjusted under 35 U.S.C. 154(b) by 90 days.

(21) Appl. No.: 13/309,030

(22) Filed: Dec. 1, 2011

(65) Prior Publication Data

US 2013/0142075 A1 Jun. 6, 2013

(51) Int. Cl.
 *H04L 12/28* (2006.01)
(52) U.S. Cl.
 USPC .............................. 370/254; 370/351
(58) Field of Classification Search
 USPC .......... 370/469, 218, 235, 225, 223; 709/238
 See application file for complete search history.

(56) References Cited

U.S. PATENT DOCUMENTS

| | | | |
|---|---|---|---|
| 7,471,625 B2 * | 12/2008 | Suemura | 370/223 |
| 2005/0220141 A1 * | 10/2005 | Ma et al. | 370/469 |
| 2009/0003211 A1 * | 1/2009 | Akyamac et al. | 370/235 |
| 2011/0243030 A1 * | 10/2011 | Zhang et al. | 370/254 |

* cited by examiner

*Primary Examiner* — Raj Jain
*Assistant Examiner* — Jamaal Henson
(74) *Attorney, Agent, or Firm* — Jenkins, Wilson, Taylor & Hunt, P.A.

(57) ABSTRACT

A method and apparatus for providing network failure independent links in a multilayer network comprising a client layer and a server layer, wherein each link of said client layer is served by a connection provisioned in said server layer, wherein mutually disjoint paths for said connections which serve links in said client layer that belong to the same predetermined mutually disjoint link group are calculated.

19 Claims, 4 Drawing Sheets

METHOD FOR PROVIDING NETWORK FAILURE INDEPENDENT LINKS IN A MULTILAYER NETWORK

TECHNICAL BACKGROUND

The invention relates to a method for providing network failure independent links in a multilayer network comprising a client layer and a server layer.

Multilayer networks can comprise at least one client layer and a corresponding server layer which provides services to the client layer. An aspect of traffic engineering of a contemporary transport network is protecting services which the network provides for its users against various network failures such as fiber cuts, device failures, software bugs, configuration errors etc. Such protection is usually achieved in a conventional network via network over-provisioning. The topology of a multilayer network is made up of links and switching elements that can carry user traffic as well as of redundant links that have sufficient unused bandwidth to accommodate the user traffic in case that one or more of the operating or working links go unexpectedly out of service. A major challenge in the context of service protection is the fact that it is never known in advance where the failures are located or occur. Accordingly, working links and the protecting links must be selected to be independent from each other so that it is impossible for a single network failure to bring down both, a working link and the corresponding link protecting the working link.

Accordingly, there is a need for a method for providing network failure independent links in a multilayer network to provide an operative multilayer network even when working links go out of service.

SUMMARY OF THE INVENTION

The invention provides a method for providing network failure independent links in a multilayer network comprising a client layer and a server layer, wherein each link of said client layer is served by a connection provisioned in said server layer, wherein mutually disjoint paths for said connections which serve links in said client layer that belong to the same predetermined mutually disjoint link group MDLG are calculated.

In a possible embodiment of the method according to the present invention each mutually disjoint link group MDLG comprises a server layer unique mutually disjoin link group identifier, MDLG-ID.

In a possible embodiment of the method according to the present invention two or more links of the client layer are configurable to belong to the same mutually disjoint link group.

In a further possible embodiment of the method according to the present invention two or more links of the client layer have link configuration parameters comprising the MDLG identifiers of all mutually disjoint link groups to which these links belong.

In a further possible embodiment of the method according to the present invention the MDLG identifiers of all mutually disjoint link groups to which a link of the client layer belongs to form a group list of mutually disjoint link groups of the respective link.

In a further possible embodiment of the method according to the present invention if it is detected that a new link associated with a non-empty group list of mutually disjoint link groups is provisioned in said client layer of said multilayer network, other links of said client layer are identified belonging to at least one of the mutually disjoint link groups indicated in the non-empty group list of said new link.

In a possible embodiment of the method according to the present invention a path for a connection which serves the new link is calculated to be as disjoint as possible from the paths calculated for connections serving existing links within each mutually disjoint link group.

In a further possible embodiment of the method according to the present invention the calculated paths serving the existing links are modified while keeping them disjoint from each other to make them disjoint from the path calculated for the connection which serves the new link.

In a possible embodiment of the method according to the present invention if the path successfully calculated for the connection which serves the new link is completely disjoint from the paths serving the existing links of the client layer, the new link is added to a client layer topology of said client layer.

In a further possible embodiment of the method according to the present invention the new link is added to the client layer topology of said client layer by advertising the new link via a client layer routing protocol to said client layer.

In a further possible embodiment of the method according to the present invention the mutually disjoint link groups indicated in said non-empty group list of said new link added to the client layer topology are advertised to the client layer.

In a further possible embodiment of the method according to the present invention the link advertisements of all links of the client layer are evaluated to discover links having at least one mutually disjoint link group in common.

In a further possible embodiment of the method according to the present invention the discovered links are recognized as failure independent links which can be adapted to protect each other against a single network failure.

In a further possible embodiment of the method according to the present invention each layer of the multilayer network comprises nodes connected to each other directly via a single link or several parallel links or indirectly via a sequence of links forming a connection between the respective nodes.

In a further possible embodiment of the method according to the present invention a network failure comprises a link failure of a link, a node failure of a node, a configuration error, and/or an application program error.

The invention further provides a multilayer network comprising a client layer and a server layer, each link of said client layer being served by a connection provisioned in said server layer, and comprising means adapted to calculate mutually disjoint paths for said connections which serve links in said client layer that belong to the same predetermined mutually disjoint link group.

In a possible embodiment of the multilayer network according to the present invention each layer of the multilayer network comprises nodes connected to each other directly via a single link or set of parallel links or indirectly via a sequence of links forming a connection between the respective nodes.

In a possible embodiment of the multilayer network according to the present invention the client layer is a packet switched client layer comprising routers.

In a further possible embodiment of the multilayer network according to the present invention the server layer is an optical server layer comprising routers and optical switches.

In a further possible embodiment of the multilayer network according to the present invention the optical server layer is formed by a wavelength division multiplexing server layer.

In a further possible embodiment of the multilayer network according to the present invention the links are formed by wireless links.

In a further possible embodiment of the multilayer network according to the present invention the links are formed by wired links.

BRIEF DESCRIPTION OF FIGURES

In the following different embodiments of the method for providing network failure independent links in a multilayer network are described with reference to the enclosed figures in more detail.

DETAILED DESCRIPTION OF EMBODIMENTS

Figure 1:
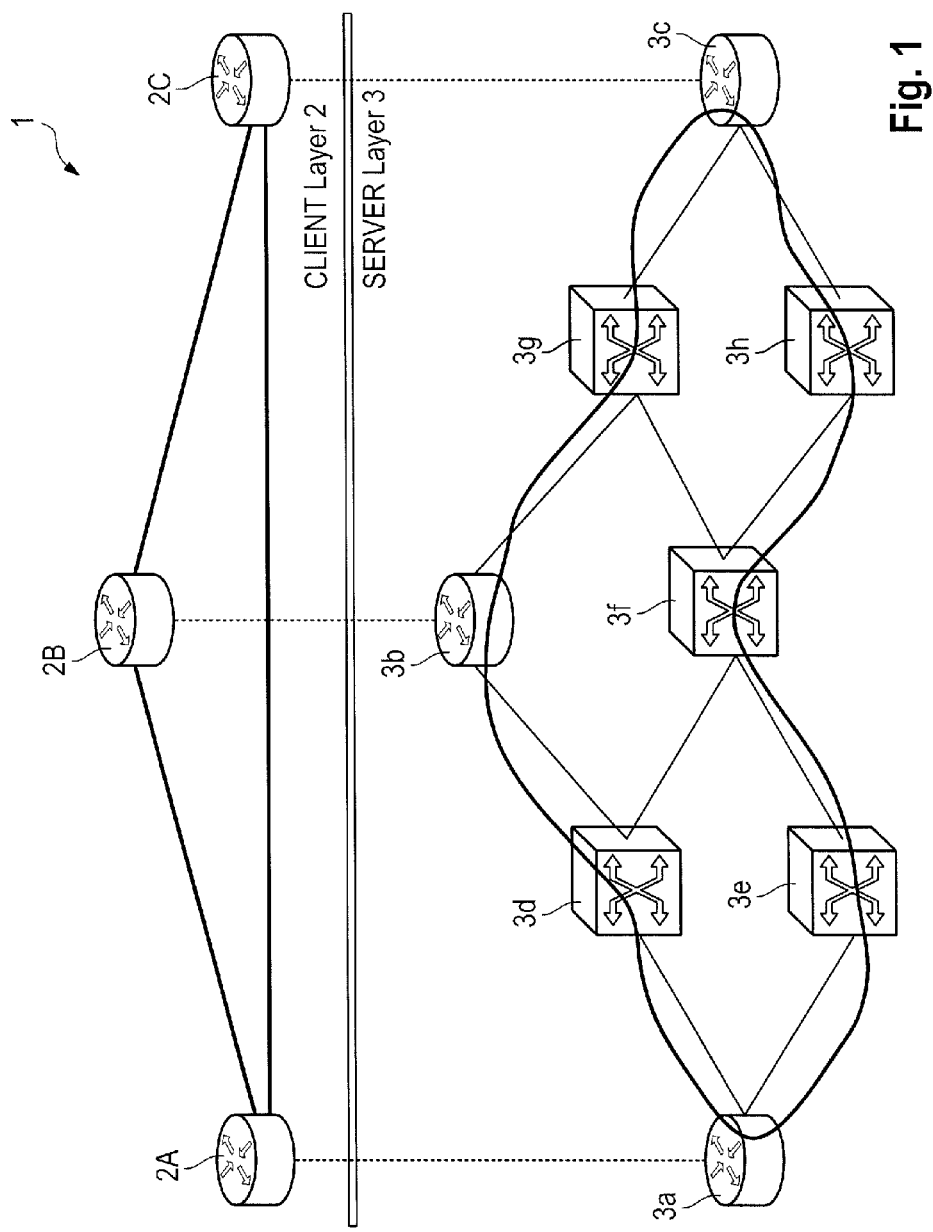
FIG. 1 shows an exemplary multilayer network for which a method for providing network failure independent links according to the present invention can be performed.

FIG. 1 shows a multilayer network 1 having a client layer 2 and a corresponding server layer 3. In a possible implementation the client layer 2 can be a packet switching layer comprising nodes 2A, 2B, 2C formed for example by routers. The different nodes 2A, 2B, 2C of the client layer 2 are connected to each other by links. These links can be formed by wireless or by wired links. In the shown simple exemplary embodiment the client layer 2 of the multilayer network 1 comprises three links, i.e. a first link [A-B] between node 2A and node 2B, a second link [B-C] between the second node 2B and the third node 2C and a third link [A-C] between the first node 2A and the third node 2C of the client layer 2.

As can be seen from FIG. 1A there is a signal path {[A-B][B-C]} to be provided to protect signal path{[A-C]}. Accordingly, for example if the link [A-C] between the first node 2A and a third node 2C fails there is still a connection between the first node 2A and the third node 2C comprising a link [A-B] and a link [B-C] via the second node 2B. In the same manner the path {[A-C][C-B]} is provided to protect link {[A-B]} and the path {[B-A][A-C]} is provided to protect link {[B-C]}. The server layer 3 is provided to serve the client layer 2 and to provide services for the client layer 2. Each link of the client layer 2 is served by a connection provisioned in the server layer 3. The layers of the multilayer network 1 comprise nodes connected to each other directly via a single link of several parallel links or indirectly via a sequence of links forming a connection between the respective nodes. Accordingly, a sequence of links forms a connection between nodes. In a possible implementation the server layer 3 can be formed by an optical server layer comprising routers and optical switches. In a further possible implementation this optical server layer can be formed by a wavelength division multiplexing WDM server layer. In an alternative embodiment the server layer 3 may be another kind of network comprising electrical wired or wireless links. To provide network failure independent links between the nodes mutually disjoint paths for the connections which serve links in the client layer 2 that belong to the same predetermined mutually disjoint link group, MDLG, are calculated. For example, FIG. 1 shows the paths {[a-d, d-b]}, {[a-e, e-f, f-h, h-c]} and {[b-g, g-c]} that are configured within the same mutually disjoint link group, MDLG, where they are computed to be mutually disjoint from each other. This mutually disjoint link group MDLG can comprise a server layer unique MDLG identifier MDLG-ID. The mutually disjoint link group MDLG is a group of links in a given layer that are guaranteed to be mutually network failure independent. This independence is enforced by routing the server layer connections serving the links of the client layer 2 over paths sufficiently disjoint from each other so that it is impossible for a single failure in the server layer 3 to affect more than one connection from the mutually disjoint link group MDLG. For example, if links of a client layer topology are served by server layer connections, the links can be provisioned to be failure independent by forcing the corresponding serving connections of the server layer 3 not to traverse the same links and switching elements in the server layer 3.

A process of provisioning links that belong to one or more mutually disjoint link groups MDLGs can be described as follows. A link can be configured to belong to one or more mutually disjoint link groups MDLGs. This can be accomplished by specifying one or more server layer network unique identifiers MDLG-IDs among the configuration parameters of the respective link. A server layer control plane traffic engineering application learns about the appearance of a new link associated with a non-empty list of mutually disjoint link groups MDLGs that can identify other links belonging to each of the mutually disjoint link groups MDLGs.

Two or more links of the client layer 2 can be configured to belong to the same mutually disjoint link group MDLG. Two or more links of the client layer 2 can have link configuration parameters comprising the MDLG identifiers all mutually disjoint link groups MDLGs to which the respective links belong to. The MDLG identifiers MDLG-IDs of all mutually disjoint link groups MDLG to which a link of the client layer 2 belongs to form a group list of the mutually disjoint link groups MDLGs of the respective link. If it is detected that a new link associated with a non-empty group list of mutually disjoint link groups MDLGs is provisioned in the client layer 2 of the multilayer network 1, other links of the client layer 2 are identified belonging to at least one of the mutually disjoint link groups MDLGs indicated in the non-empty group list of that new link.

A path for a connection which serves the new link is calculated to be as disjoint as possible from the path calculated for connections serving existing links within each mutually discount link group MDLG. It is possible that the path selected for the existing links are modified to make them disjoint from the path selected for the connection to serve the new link. The calculated path serving the existing links are modified while keeping them disjoint from each other to make them disjoint from the path calculated for the connection which serves the new link.

If the path is successfully calculated for the connection which serves the new link is completely disjoint from the path serving the existing links of the client layer 2 a new link is added to a client layer topology of the client layer 2. The new link is added the client layer topology of the client layer 2 in a possible embodiment by advertising the new link via a client layer routing protocol to the nodes of the client layer 2. Accordingly, if the path computation succeeds the new link is added to the client layer topology by advertising the link via the client layer routing protocol. The mutually disjoint link groups MDLGs of the link are advertised to the client layer 2 as well. Accordingly, the mutually disjoint link groups MDLGs indicated in the non-empty group list of the new link added to the client layer topology is advertised to the client layer 2.

The link advertisement of all links of the client layer 2 can be evaluated to discover links having at least one mutually disjoint link group MDLG in common. The discovered links are recognized as failure independent links which can be adapted to protect each other against single network failures.

These kind of network failures can comprise a link failure of a link, a node failure of a node, a configuration error or an application program error.

A client layer management or control plan can use the information when building various recovery schemes such as MPLS fast reroute FRR looking into the link advertisements to discover links having at least one mutually disjoint link group MDLG in common. Such links cannot be brought down by a single network failure and, hence, can protect each other. The client layer 2 and the server layer 3 of the multi-layer network 1 are formed by different kind of networks having nodes connected to each other by wired or wireless links. For example, the server layer 3 can be formed by an optical network layer such as a wavelength division multiplexing network. The server layer 3 can also be formed e.g. by an ATM network or an Ethernet network. The nodes of the different network layers can be immobile nodes but also mobile nodes.

The client layer 2 as shown in FIG. 1 can for example form a fragment of a client IP network. In this exemplary embodiment the nodes 2A, 2B, 2C formed by routers need to be interconnected via the links [A-B], [B-C] and [A-C]. These links are to be served by connections in the server layer 3 and can be formed for example by an optical layer network. The links of the client layer 2 participate in the same protection schemes, i.e. they are provided to protect each other against at least one single network failure. The protection schemes of the client layer 2, accordingly, need to be mutually failure independent. The protection scheme is provided so that it is impossible for a single network failure to take more than one of the three links of the client layer 2 out of service. This is achieved by routing connections of the server layer 3 serving the client layer links away from each other using a MDLG method as follows.

Figure 2A:
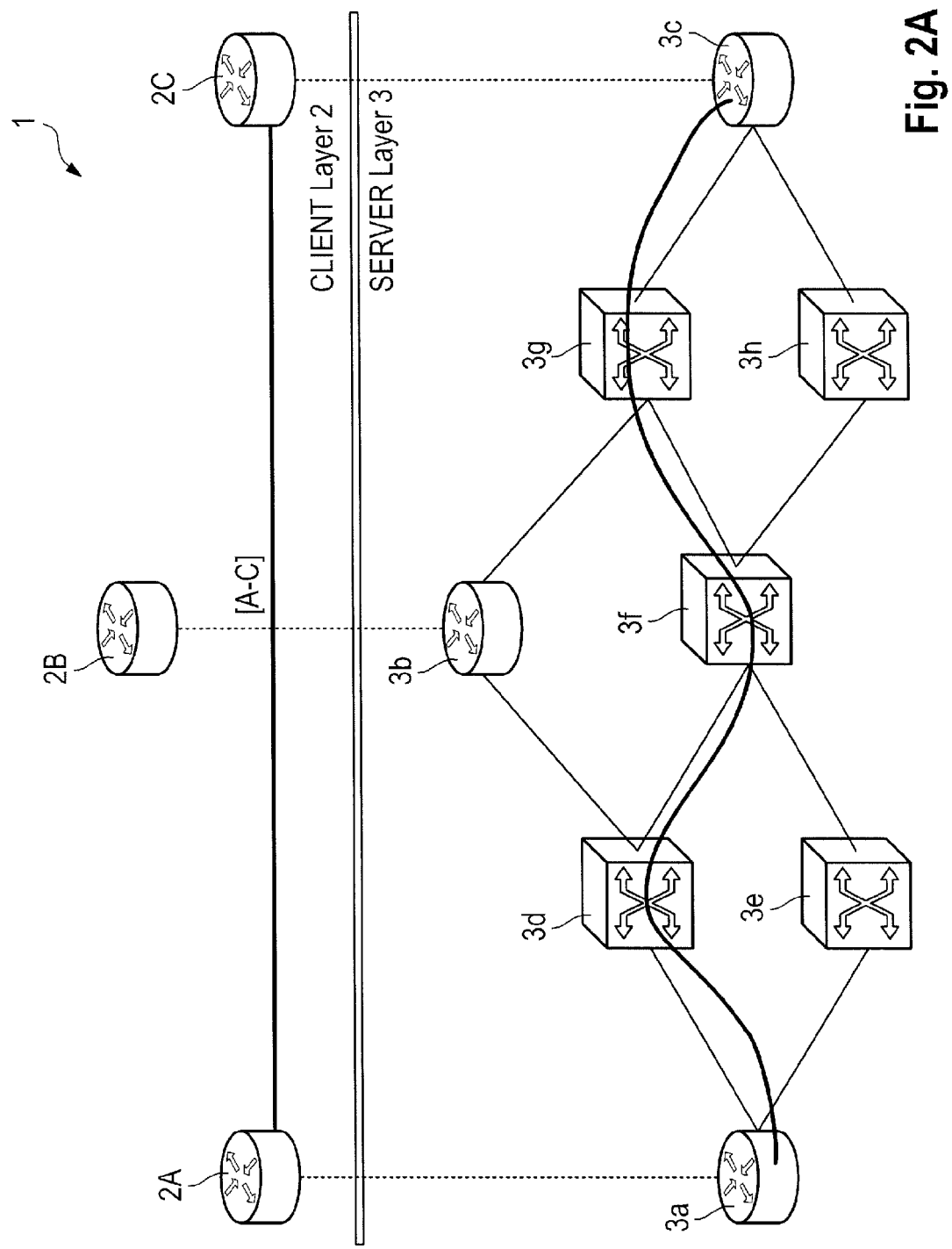
FIGS. 2A, 2B, 2C illustrate several method steps for providing failure independent links in the exemplary multilayer network of FIG. 1 which are performed by the method for providing network failure independent links according to the present invention.

In a first step all three links of the client layer 2 as depicted in FIG. 1 are configured with the same mutually disjoint link group MDLG, for example MDLGx. In a first step as illustrated in connection with FIG. 2A a layer connection serving the first client layer link [A-C] is routed. In the shown example because so far there are no other client layer links configured with MDLGx the connection is placed for the best available path which can be computed for the server layer 3. In the shown example of FIG. 2A the computed path is {[ad]-[df]-[fg]-[gc]} connecting node 3a and node 3c within the server layer 3. In the shown exemplary embodiment nodes 3a, 3b, 3c can be formed by routers and nodes 3d, 3e, 3f, 3g, 3h can be formed by optical switches. Accordingly, the calculated best path connects routers 3a, 3c via optical switches 3d, 3f, 3g. This calculated path in between the two routers 3a, 3c connects the routers indirectly via four links of the server layer 3 to serve the client layer link [A-C] of the client layer 2 as illustrated in FIG. 2A.

Figure 2B:
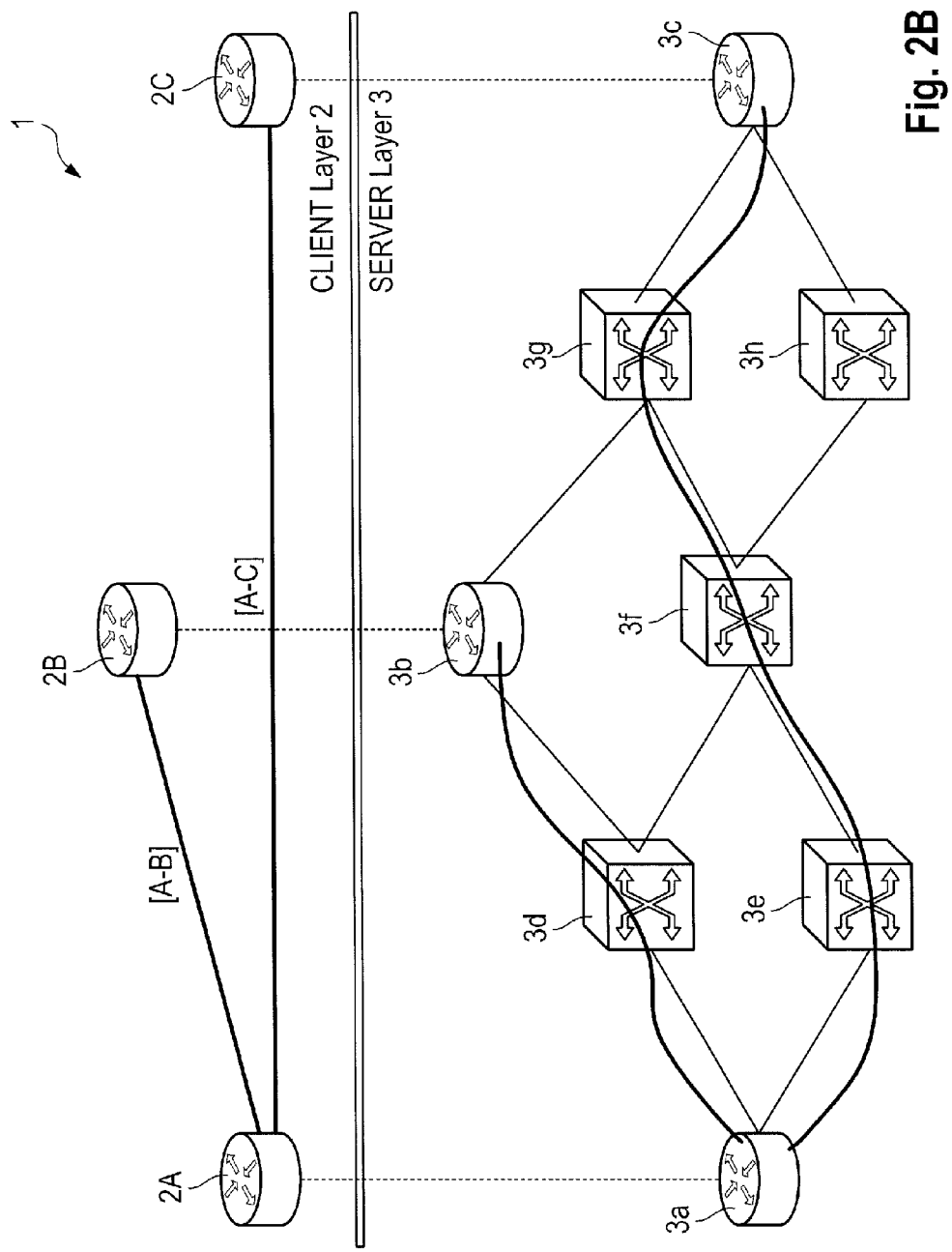

In a further step S2 as illustrated in FIG. 2B the server layer connection serving the second client layer link [A-B] is routed. Because by this time another client layer link is known to be associated with the mutually disjoint link group MDLGx, i.e. the link [A-C], the server layer connections supporting the two client layer links [A-C, A-B] are rerouted to be disjoint from each other. In the shown example this path computation causes a replacement of the connection serving the first client layer link [A-C] from the path {[ad]-[df]-[fg]-[gc]} to a path {[ae]-[ef]-[fg]-[gc]}. It is necessary to make room for routing the second server layer connection sufficiently disjoint from the path computed for the first connection. Accordingly, as can be seen in FIG. 2B the first router 3a and the third router 3c of the server layer 3 are connected via the optical switches 3e, 3f, 3g. The second router 2b is connected to the first router 3a via the optical switch 3d. Therefore, the previously computed path between 3a and 3c is automatically readjusted for the two paths to be mutually disjoint.

Figure 2C:
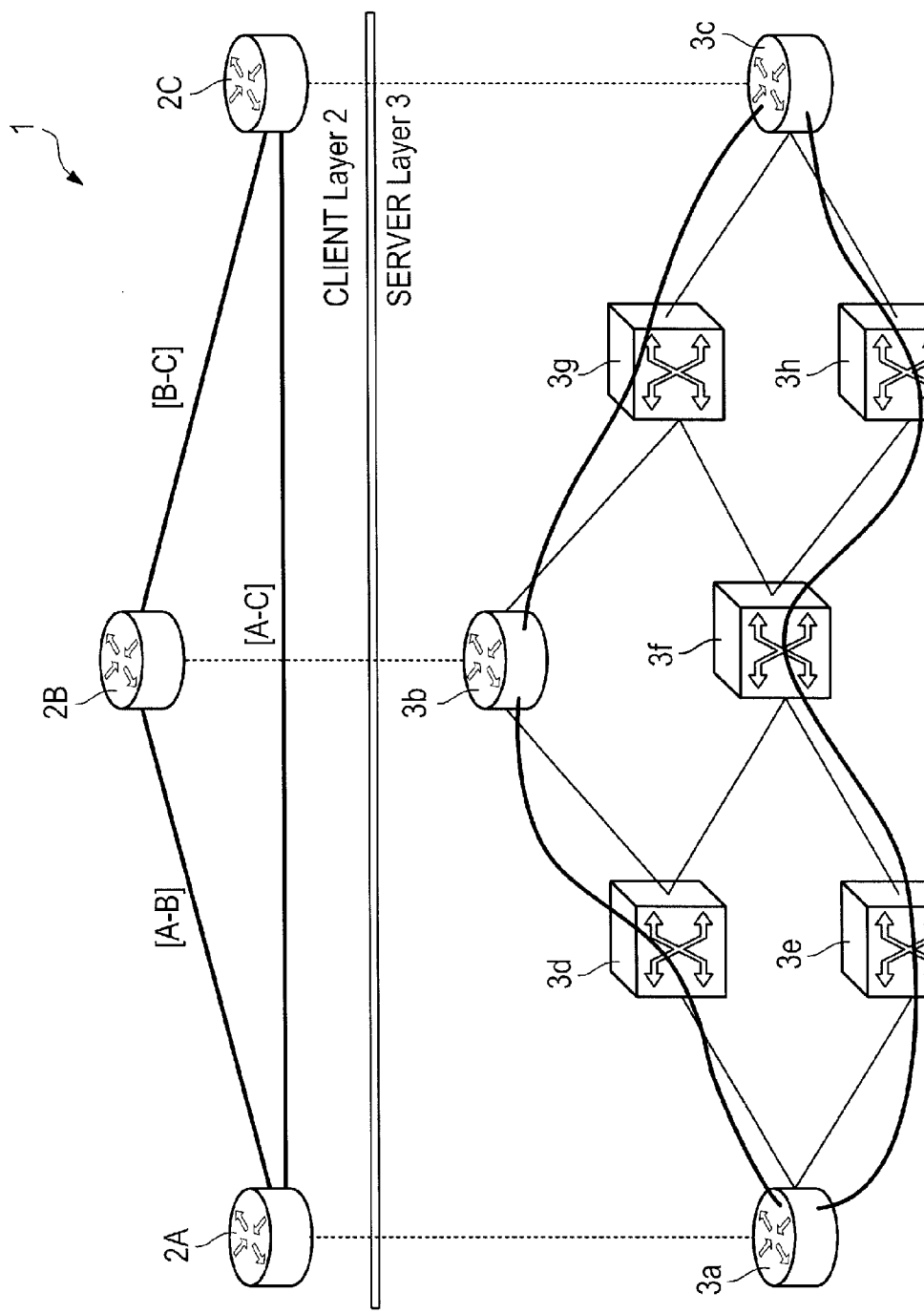

In a further step as illustrated in FIG. 2C a server layer connection serving the third client layer link [BC] is routed. By that time, the path computation entity is aware of two other client layer links associated with the mutually disjoint link group MDLGx. Therefore, the path for the third server layer connection has to be disjoint from the previous two calculated paths. As can be seen in the exemplary server layer this time the path computation leaves the previously calculated path for the connection serving the client layer link [A-B] unchanged but the other path computed for the first server layer connection, i.e. the connection serving the client layer link [A-C] is modified again from {[ae]-[ef]-[fg]-[gc]} to {[ae]-[ef]-[fh]-[hc]}. This is done to accommodate the third server layer connection while maintaining all three connections mutually disjoint.

The method according to the present invention requires in the given example to advertise a single mutually disjoint link group MDLG per link and generally speaking requires only a small number of MDLGs per link to be advertised. The method according to the present invention guarantees automatically necessary path disjointness of the server layer 3. The calculation can be performed dynamically, e.g. via online path computations by using solely control plane means. The calculation can be performed by a centralized or distributed program that has an access to a network traffic engineering data base TED, i.e. a collection of network advertisements. One can implement various algorithms for the purpose of path selection and path computation. In a possible implementation the entity calculating the path can belong to the server layer 3. This calculation unit or calculation entity is located in this embodiment on one of the nodes selected by means of the control plane or by a management plane. Alternatively, the calculation entity for calculating the path can be located on a stand-alone workstation. If that forms part of a mutually disjoint link group MDLG it can in a possible embodiment be manually configured with the identifier of this group MDLG-ID. This attribute along with all other attributes of the respective link can be advertised in a possible implementation into the routing domain via a routing protocol. This means, that every routing protocol speaker of all nodes of the layer gets this information. As a consequence, the node or workstation that is charged with the responsibility to compute the path for the MDLG members is a routing protocol speaker, i.e. does participate in the respective routing protocol. The MDLG method according to the present invention ensures the existence of network failure independent links via a dynamic concurrent connection or re-routing of connections serving the links forcing the path selection to sufficiently divert each path from all others. Therefore, if it is determined that two or more links have a mutually discount link group MDLG in common it is automatically guaranteed by use of the method according to the present invention that the links are network failure independent. With the method according to the present invention it is permissible to modify one, some or even all paths of connections having links within a given mutually disjoint link group MDLG as long as the paths remain mutually disjoint. Such and path modification allows for the server layer 3 to take advantage of newly added network resources for more optimal paths and address maintenance needs, or network outages to carry out various network policies. The method according to the present invention requires only a single or small number of mutually disjoint link groups MDLGs configured and advertised per link. Accordingly, the method of the present invention is much easier to use than compared to conventional methods as far as the client layer 2 is concerned. Therefore, the method according to the present invention is very efficient and can be performed with high speed to protect a multilayer network 1 against network failures. The method according to the present invention calculates the network failure independent links with high speed efficiently and automatically so that a safe operation of the multilayer network 1 is guaranteed at all times.

The invention claimed is:

1. A method for providing a plurality of network failure independent links in a multilayer network comprising a client layer and a server layer, wherein said client layer comprises two or more links, the method comprising:
   serving each of said two or more links of said client layer by a connection provisioned in said server layer,
   calculating a plurality of mutually disjoint paths for said connections which serve the two or more links in said client layer, whereby the two or more links belong to a mutually disjoint link group,
   wherein said mutually disjoint link group comprises a server layer unique mutually disjoint link group identifier.

2. The method according to claim 1, wherein two or more links of said client layer have link configuration parameters comprising the mutually disjoint link group identifiers of all mutually disjoint link groups to which said link belongs.

3. The method according to claim 2, wherein the mutually disjoint link group identifiers of all mutually disjoint link groups to which a link of said client layer belongs to form a group list of mutually disjoint link groups of the respective link.

4. The method according to claim 1, wherein, if it is detected that a new link associated with a non-empty group list of mutually disjoint link groups is provided in said client layer of said multilayer network, other links of said client layer are identified belonging to each of the mutually disjoint link groups indicated in said non-empty group list of said new link.

5. The method according to claim 4, wherein a path for a connection which serves the new link is calculated to be as disjoint as possible from the paths calculated for connections serving existing links within each mutually disjoint link group.

6. The method according to claim 5, wherein the calculated paths serving the existing links are modified while keeping them disjoint from each other to make them disjoint from the path calculated for the connection which serves the new link.

7. The method according to claim 6, wherein if the path successfully calculated for the connection which serves the new link is completely disjoint from the paths serving the existing links of said client layer, the new link is added to a client layer topology of said client layer.

8. The method according to claim 7, wherein the new link is added to the client layer topology of said client layer by advertising the new link via a client lager routing protocol to said client layer.

9. The method according to claim 8, wherein the mutually disjoint link groups indicated in said non-empty group list of said new link added to the client layer topology is advertised to said client layer.

10. The method according to claim 9, wherein the link advertisements of all links of said client layer are evaluated to discover links having at least one mutually disjoint link group in common.

11. The method according to claim 10, wherein the discovered links are recognized as failure independent links which can be adapted to protect each other against a single network failure.

12. The method according to claim 1, wherein each layer of said multilayer network comprises nodes connected to each other directly via a single link or several parallel links or indirectly via a sequence of links forming a connection between the respective nodes.

13. The method according to claim 1, wherein a network failure comprises
   a link failure of a link,
   a node failure of a node,
   a configuration error, and
   an application program error.

14. A multilayer network, comprising:
   a client layer and a server layer, said client layer comprising two or more links, said two or more links of said client layer being served by a plurality of connections provisioned in said server layer, and
   means to calculate a plurality of mutually disjoint paths for said plurality of connections of said two or more links in said client layer, said plurality of mutually disjoined paths all belonging to a mutually disjoint link group,
   wherein said mutually disjoint link group comprises a server layer unique mutually disjoint link group identifier.

15. The multilayer network according to claim 14, wherein each layer of said multilayer network comprises nodes connected to each other directly via a single link or set of parallel links or indirectly via a sequence of links forming a connection between the respective nodes.

16. The multilayer network according to claim 14, wherein said client layer is a packet client layer comprising routers.

17. The multilayer network according to claim 14, wherein said server layer is an optical server layer comprising routers and optical switches.

18. The multilayer network according to claim 17, wherein said optical server layer is a wavelength division multiplexing server layer.

19. The multilayer network according to claim 14, wherein said links are formed by wireless or wired links.

* * * * *